INVENTOR
PAUL J. FELKER

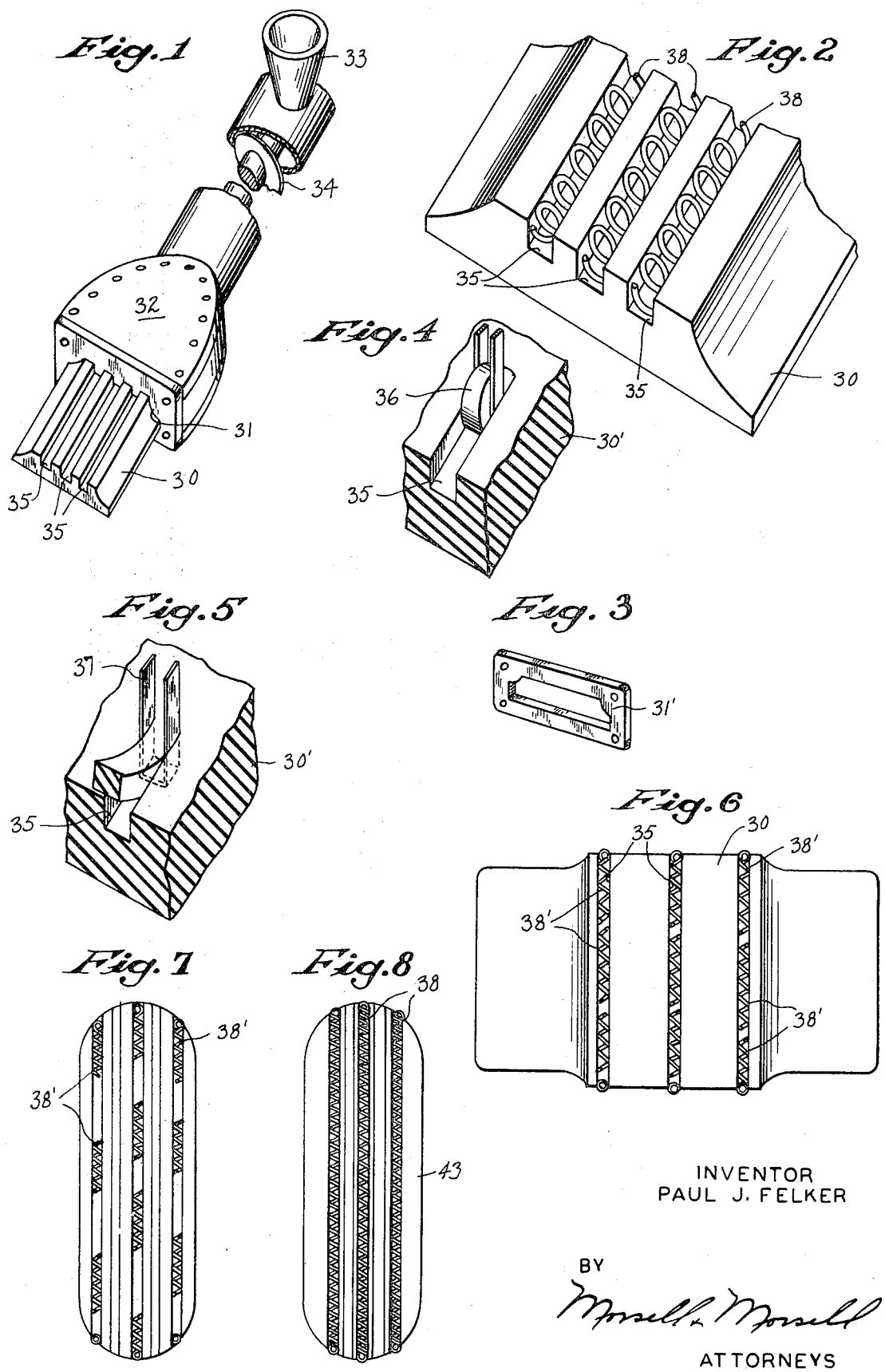

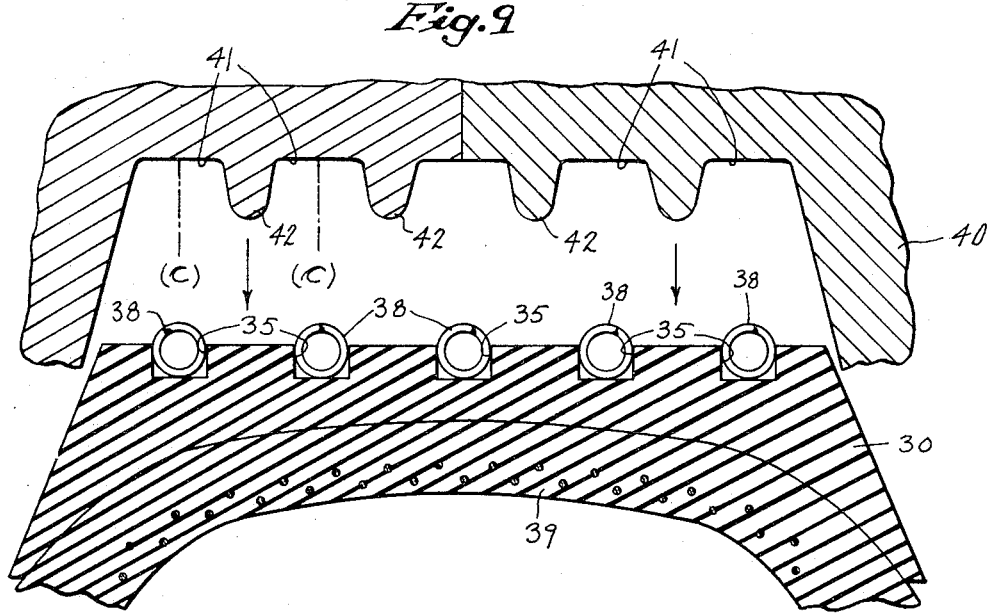
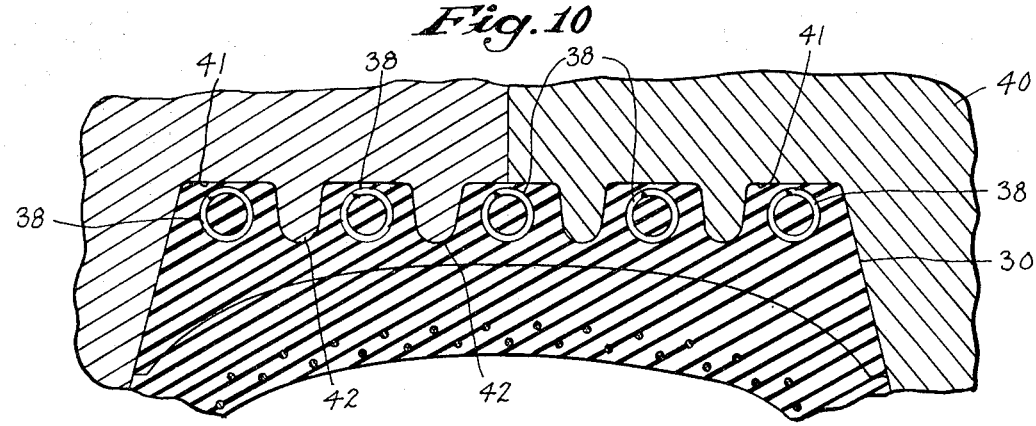
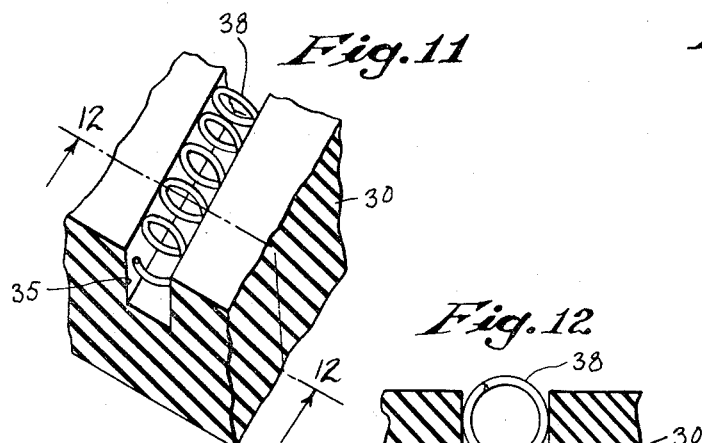
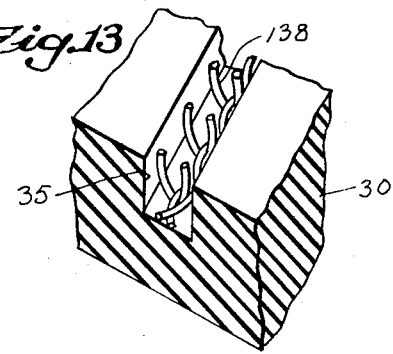
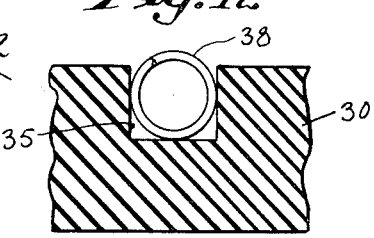
INVENTOR
PAUL J. FELKER

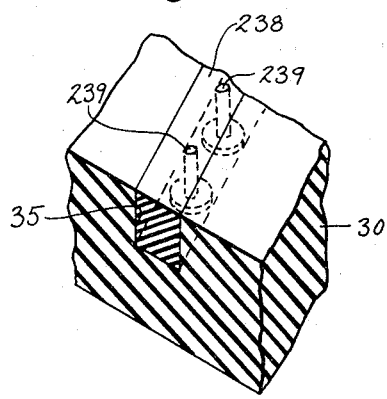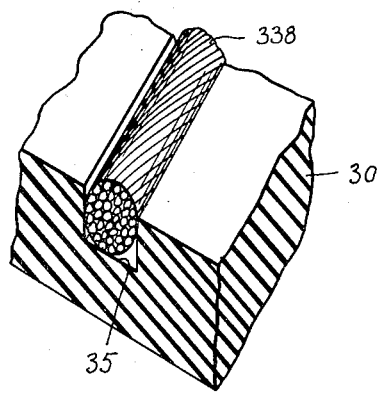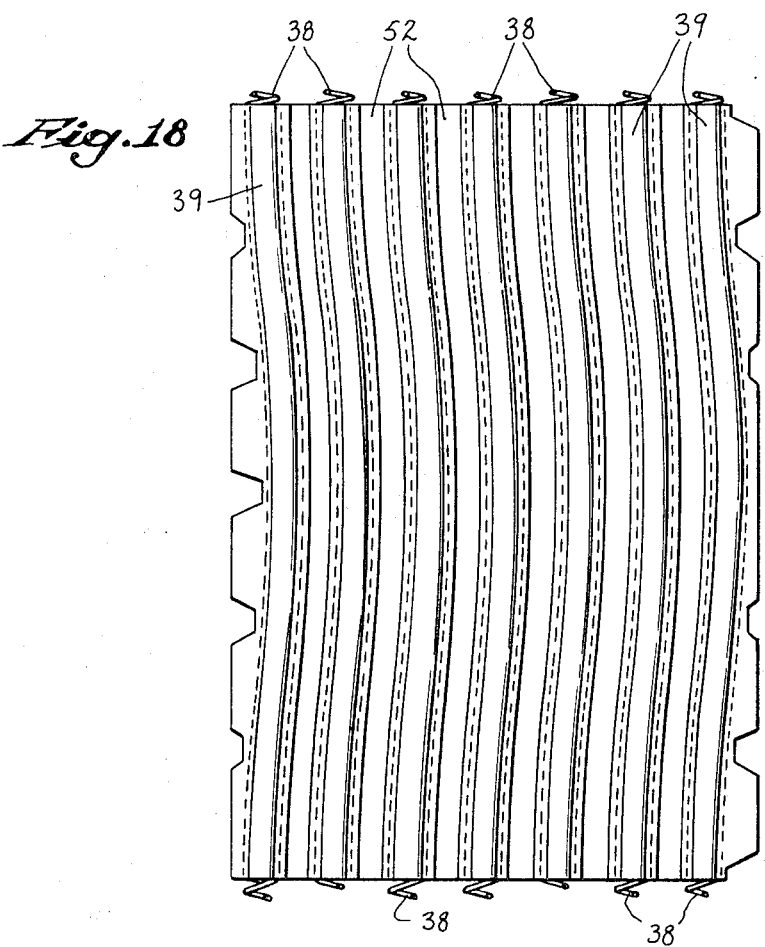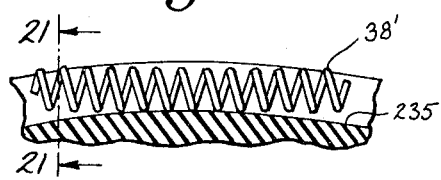

BY Morell & Morell
ATTORNEYS

United States Patent Office 3,565,716
Patented Feb. 23, 1971

---

3,565,716
METHOD OF FORMING TIRE TREADS WITH ELONGATED TRACTION-AUGMENTING ELEMENTS
Paul J. Felker, Marshfield, Wis., assignor to Penetred Corporation, Marshfield, Wis., a corporation of Wisconsin
Filed Apr. 23, 1969, Ser. No. 818,768
Int. Cl. B29h *17/38*
U.S. Cl. 156—114                                    7 Claims

ABSTRACT OF THE DISCLOSURE

In a method of manufacturing tire treads, the steps of producing a strip of uncured rubber tread stock with longitudinally-extending locating grooves therein, wrapping and securing a length of said tread stock around a tire to be retreaded or around a green tire in the manufacture of new tires, inserting elongated traction-augmenting members such as wire coils of a size to be snugly received and held in said grooves, and curing the tread stock by applying heat and molding pressure with the use of a matrix having a tread pattern which includes ribs positioned to form grooves in the tread between the traction-augmenting members and to cause rubber to flow into the locating grooves to cure around the traction-augmenting members.

BACKGROUND OF THE INVENTION

Field of the invention

The present invention pertains to the retreading of tires or to the manufacture of new tires wherein the tread portion has elongated circumferentially-extending rider strips, with traction-augmenting members such as wire coils in the rider strips.

Description of the prior art

It has heretofore been proposed to retread tires or to manufacture new tires with wire coils embedded in the rubber of the rider strips. The proper positioning of the coils during the tread molding operation has always presented problems. Heretofore it has been customary to cut a length of wire coil approximately two inches longer than the circumference of the tire and to insert by hand one of these coils in each of the grooves of the matrix with ends abutting. With this arrangement the wire coils are longitudinally compressed because of their greater length and they thereby maintain themselves seated in the grooves of the matrix. With this general method of procedure centering of the coils in the grooves of the matrix presented a problem, but in Crooker Pat. No. 2,619,678 this problem was dealt with by having a centering channel in the bottom of each of the matrix grooves. In my prior Pat. No. 3,283,053, sipe-forming strips were used in the grooves of the matrix for centering wire coils in the grooves. Where the grooves are serpentine, the proper placement of the coils in the matrix was a difficult time-consuming process.

SUMMARY OF THE INVENTION

The present invention provides a method of forming tire treads wherein the strip of uncured rubber tread stock is provided with circumferentially-extending grooves for receiving, locating, and temporarily holding wire coils or other traction-augmenting members during the tread-forming operation, the grooves being so located in the tread stock that during the tread molding operation the coils will be properly received in the pattern-forming grooves of the matrix and the ribs of the matrix being located to form grooves in the tread stock which are between the traction-augmenting members in the final tread, the rubber of the tread stock being caused to flow and cure around the traction-augmenting members during the molding procedure and to fill any voids in the locating grooves.

It is a general object of the present invention to provide an improved method wherein wire coils or other traction-augmenting members are loaded in the tread strips for use with green tires or in the camelback which is to be used for retreads, the improved method serving to hold the members in position during the molding operation and to locate them in proper position with respect to the rider strip-forming grooves of the matrix. This method is to be distinguished from prior methods where the coils must be loaded by hand in the matrix.

A further object of the invention is to provide a method as above described which permits the use of segmental lengths of wire coils or traction-augmenting members so as to allow for expansion of the tread slab during the molding operation, this being particularly important in the forming of new tires.

A further object of the invention is to provide a method which makes it possible to preload coils in tread slabs which are to be formed by a matrix having a pattern which includes curved or angled rider strip-forming grooves separated by similarly curved or angled ribs.

A further object of the invention is to provide a method as above described wherein the traction-augmenting members may be inserted in the locating grooves of the tread strip either while said strips are separate from a tire or after the tread slab has been tacked onto a tire carcass or onto a green tire in the manufacture of new tires.

A further object of the invention is to provide an improved method which permits the use of full length wire coils in the retreading of radial type tires.

A further object of the invention is to provide a method suitable for use in the manufacture of new tires, wherein the pre-grooved tread slab on a green tire, as it comes from the tire builder, may be loaded with short lengths of coils, end to end, to allow for expansion when the green tire is being molded to final form.

With the above and other objects in view, the invention consists of the improvements in the art of manufacturing tire treads with elongated traction-augmenting elements, and all of its parts, combinations, and steps, as set forth in the claims, and all equivalents thereof.

BRIEF DESCRIPTION OF THE DRAWINGS

In the accompanying drawings, illustrating several preferred embodiments of the invention, in which the same reference numerals designate the same parts in all of the views:

FIG. 1 is a perspective view of tread slab extruding mechanism showing a portion of a strip of tread slab being extruded with coil-locating grooves therein, parts of the mechanism being broken away;

FIG. 2 is an enlarged perspective view of a short length of the improved tread stock with wire coils pre-loaded in the grooves;

FIG. 3 is a perspective view showing an alternate type of die plate for use with the extruding mechanism of FIG. 1, when forming a tread slab without having the locating grooves formed during the extruding operation;

FIG. 4 is a fragmentary perspective view of a piece of tread stock showing a modified method of forming the locating grooves using tread stock which is extruded from a die opening of the type shown in FIG. 3;

FIG. 5 is a view similar to FIG. 4 showing another alternate method of forming locating grooves in the tread stock extruded from a die opening of the type of FIG. 3;

FIG. 6 is a front elevational view of a green tire as it comes from the tire builder showing segmental coils temporarily held in the grooves of the pre-grooved tread stock;

FIG. 7 is an elevational view showing the finished tire of FIG. 6 after it has been expanded and reshaped in the final mold;

FIG. 8 is a front elevational view of a finished tire manufactured by using full length coils in pre-grooved tread stock;

FIG. 9 is a fragmentary cross-sectional view of the final molding procedure showing a retread, or a green new tire, in position with respect to the matrix just prior to the application of heat and pressure;

FIG. 10 is a view similar to FIG. 9 after the tire is in curing position in the matrix;

FIG. 11 is a perspective view showing a fragment of pre-grooved tread stock with a wire coil held in the groove;

FIG. 12 is a sectional view taken on the line 12—12 of FIG. 11;

FIG. 13 is a view similar to FIG. 11 showing the use of a barbed type of traction-augmenting member in the groove, instead of a wire coil;

FIG. 14 is a view similar to FIG. 11 showing the use of a studded strip in the preformed locating groove;

FIG. 15 is a view similar to FIG. 11 showing still another alternative type of elongated traction-augmenting member in the groove;

FIG. 18 is a fragmentary view looking at the tread of a tire which has been manufactured by the method of FIGS. 16 and 17;

FIG. 22 is a sectional view taken on the line 22—22 of FIG. 21.

DESCRIPTION OF THE PREFERRED EMBODIMENTS

Figure 16:
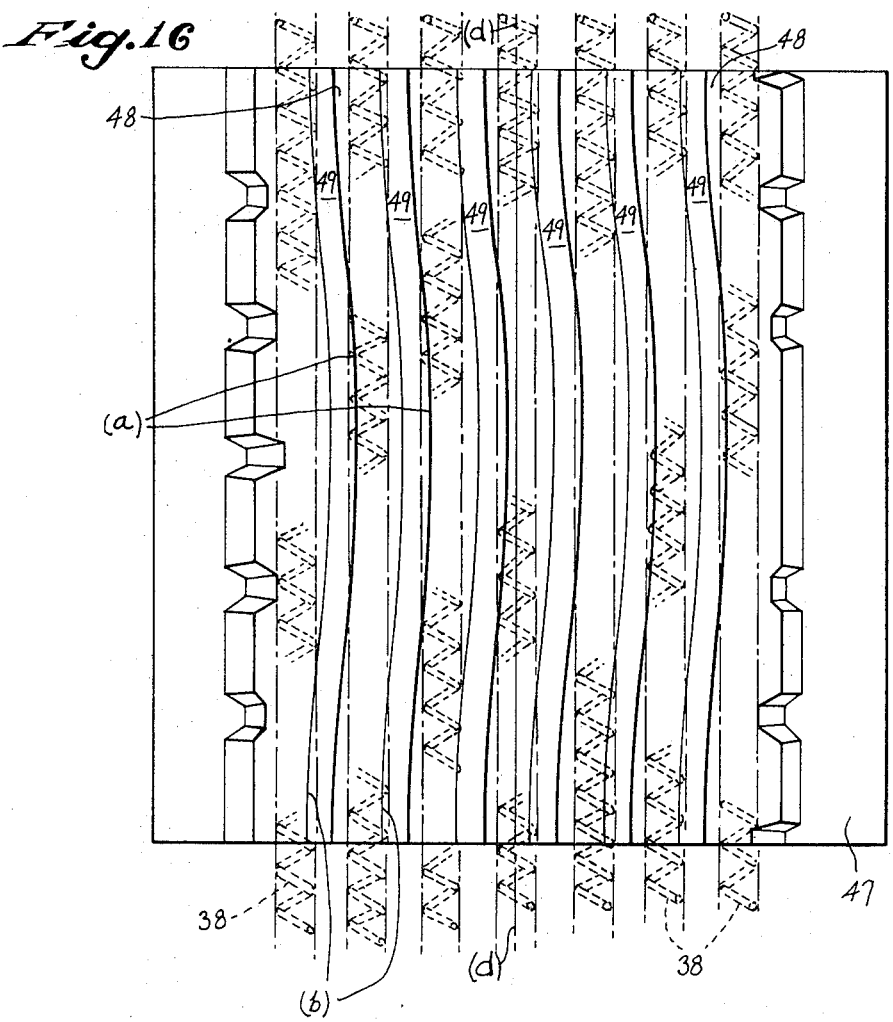
FIG. 16 is a view looking at the pattern side of a section of the matrix for forming a tire with serpentine rider strips, the relationship of the wire coils of the pre-loaded tread slab to these grooves being indicated by broken lines.

In carrying out the invention a continuous strip of rubber or rubber-like tread stock 30 may be extruded from the front plate opening 31 of an extruding die member 32. This tread stock is in an uncured partially plastic form, the same as the so-called "camelback" used in retreading operations. In the extruding operation, chunks of the rubber material are fed into a suitable hopper 33 and are fed by an auger 34 to the extruding member 32. The extruder die plate which has the opening 31 preforms locating grooves 35 in the strip of tread stock. Only three of such grooves are shown but it is understood that the die plate may be designed to form any required number of grooves depending upon the pattern in the matrix which it is desired to conform with.

As an alternative method, a die plate with a conventional opening 31', as shown in FIG. 3, may be used by which tread stock 30' as shown in FIGS. 4 and 5 will be extruded in conventional form without the locating grooves 35. These grooves can then either be rolled into the uncured tread stock by use of pressure rollers 36, as in FIG. 4, or may be cut into the tread stock by use of a cutter 37, as in FIG. 5. The net result of any of the three methods is a strip of tread stock as shown in FIG. 2, with the preformed locating grooves 35 therein and the word "forming" as used in the claims contemplates any of these methods of creating grooves. These grooves are located as required for use with a particular matrix, as will be hereinafter described.

The grooves should be a minimum of half the diameter of the wire coils 38 in depth, as shown in FIG. 9, but are preferably somewhat deeper as shown in FIG. 12. The width of the grooves is such as to snugly and frictionally hold the wire coils 38 in position, or to frictionally hold other elongated traction-augmenting members temporarily in position, such as the barbed elements 138 of FIG. 13, the studded strips 238 of FIG. 14, which are strips of uncured rubber having pre-loaded metal traction studs 239 therein, or to hold a rope type of traction-augmenting member 338 in position as in FIG. 15.

The present invention provides, as a new article of manufacture, a length of uncured tread stock 30 having the preformed locating grooves 35 therein, and having pre-loaded traction-augmenting members 38 frictionally held in said grooves as illustrated in FIG. 2. The grooves are of such depth and width with respect to the particular elongated traction-augmenting member as to hold the members in position during handling and during insertion in the mold without loss of the wire coils or other traction-augmenting members.

In the retreading of tires with wire coils 38, substantially full length coils may be used in the uncured tread slab stock 30, and this stock 30 is temporarily tacked to the carcass 39, as shown in FIG. 9. The coils may be pre-inserted as in FIG. 2 or they may be loaded when the strip 30 is on a tire carcass as in FIG. 9, and it is contemplated that the insertion step for the coils be performed at any convenient time in the series of steps regardles of the order in which it is recited in the claims. The tire is loaded into the mold so that the relationship of the grooves 35 with the grooves 41 of the matrix 40 is as shown in FIG. 9. It will be noted that in FIG. 9 there are five of the grooves 35 which are precisely located on the tread slab so as to align with the centers c of the grooves 41 of the matrix, the matrix ribs 42 being located to come midway between two of the coils 38 when the mold is in the closing position of FIG. 10. During the procedure illustrated in FIGS. 9 and 10, when it is used for retreading, the curing bag or curing tube of the mold is inflated and this inflation pressure forces the uncured rubber of the tread stock against the hot matrix 40, the uncured rubber being forced into the pattern of the matrix. After a predetermined period of exposure to the heat and pressure the curing of the rubber is completed and the tire is removed from the matrix. When the mold is in closing condition as in FIG. 10, the ribs 42 of the matrix enter the tread stock as shown and the rubber of the tread stock is forced to flow into the locating grooves 35 to fill said grooves and to cure around the wire coils 38 as shown in FIG. 10. A very similar procedure may be used in building new tires of the radial type.

FIG. 8 illustrates a tire 43 which has been retreaded by the method of FIGS. 9 and 10, the tire of FIG. 8, however, only showing three rider strips with coils. This also shows a new tire built by a two stage process where the tread stock is applied as a second stage after the green tire has been expanded.

A very similar method is used in the manufacture of conventional new tires (other than the radial type) with the features of the present invention. In FIG. 6 there is illustrated a green tire 44 as it comes from the tire builder, the green tire having a strip of pre-grooved tread stock 30 secured thereto. This tread stock has the grooves 35 preformed therein by one of the methods heretofore described. Inasmuch as considerable change in the shape takes place during the forming of the final tire of FIG. 7 from the green tire of FIG. 6, the wire coils are pre-loaded into the grooves 35 in short sections 38' as shown in FIG. 6. The pre-grooving allows short sections to be used because they are frictionally held in the preformed grooves 35. During forming of the final tire of FIG. 6 the green tire of FIG. 4 is axially compressed and circumferentially stretched by use of well known equipment and procedures, but the final forming of the tread pattern is accomplished by using a matrix very similar to what is illustrated in FIGS. 9 and 10.

As the rubber of the tread stock of FIG. 6 is stretched in the final molding, the grooves 35 become less wide to more tightly hold the coils in position. This action tends to restrict the width of the grooves, resulting in tighter squeezing of the coils. If more than half of the coils projected from the grooves after the pre-loading, the changes in shape of the green tire might have a tendency to pop the coils out of the grooves. However, by having the depth of the grooves at least equal to half of the diameter of the coils, and preferably deeper, the coils will stay in position during the molding procedure. After the matrix is in closing relationship with the tread, and after the final shaping, the green tire of FIG. 6 is changed to the form and shape shown in FIG. 7, with the ends of the wire segments 38' spaced somewhat apart in the grooves due to the enlargement of the circumference. There is still ample wire, however, to provide the desired traction-augmenting properties. By using the locating grooves it is possible to preload sectional traction-augmenting lengths and hold them in position. This is necessary because it would not be possible or practical to stretch full length coils to the extent necessary when the green tire changes in shape from that of FIG. 6 to that of FIG. 7, as takes place in the building of new tires with the method of the present invention. This change in circumference is one of the reasons it was heretofore considered necessary to load and position coils or other traction-augmenting members in the matrix in accordance with the method of prior Pat. No. 2,619,678. In the green tire of FIG. 6 the grooves 35 are located and spaced to conform with a particular tread pattern on the matrix so that when the green tire is molded to final form the center lines of the grooves 35 will be aligned with the center lines c of the recesses 41 of the matrix as is shown in FIG. 9. Thus when the new tire is completed, as well as when a retreading operation is completed, the coils 38 or 38' or other traction-augmenting members will be embedded in the rider strips 45 of the completed tread as is shown in FIG. 10, the rider strips being separated by grooves 46 which have been formed by the ribs 42 of the matrix.

Figure 19:
FIG. 19 is a fragmentary view showing a portion of a tire tread with angled grooves which may be used in lieu of the curved grooves of FIG. 18.
Figure 17:
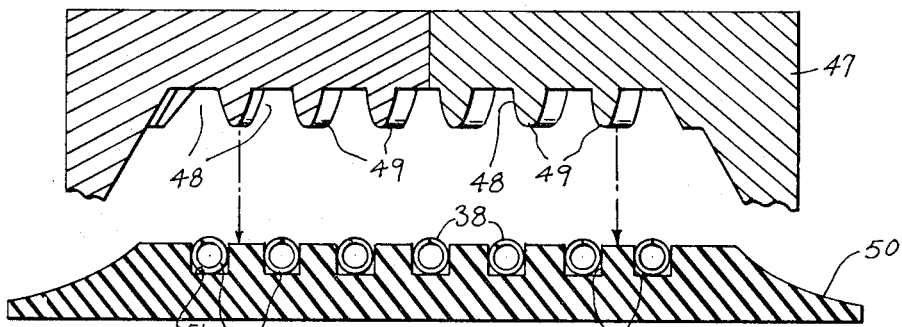
FIG. 17 is a cross-sectional view showing the relationship of a matrix of the type of FIG. 16 to the tread slab prior to the application of molding pressure.

Substantially the same method may be employed to load coils accurately in a matrix such as the matrix 47 of FIGS. 16 and 17, which matrix has curved grooves 48 separated by curved ribs 49. In lieu of the serpentine curve of the grooved 48 a similar effect may be produced by angled extents to produce angled rider strips 48' on a tire as shown diagrammatically in FIG. 19, and it is understood that a waved pattern produced by either curved grooves 48 or by angled grooves 48' is contemplated. In carrying out this method to produce tires with curved or angled rider strips, a tread slab 50 is produced by any of the methods of FIGS. 1, 4 and 5, with straight locating grooves 51 arranged to conform in position with the grooves of the matrix 47 in the manner shown in FIGS. 16 and 17. In FIG. 16 it will be seen that the coils 38 have been projected onto the matrix of FIG. 16 and shown in broken lines, and it will also be seen that the portions of the curved ribs 49 which curve the farthest to the right in FIG. 16, as indicated by reference letter a, overlap the sides of the coils. Thus, when the tire is expanded into the matrix, the curved and tapered sides of the ribs 49 will act to automatically laterally displace portions of the coils into the curved grooves 48, that is, the portions of the coils which are engaged by the waves a of the ribs 49 will be shifted to the right (referring to FIG. 16) and the portions of the coils engaged by portions b of the ribs will be shifted to the left. Thus the coils will end up in a serpentine pattern more or less matching the serpentine contour of the grooves 48 of FIG. 16. Thus, as the result of pressure and heat which is applied during curing in the matrix of FIG. 17, the coils 38 which have been temporarily supported in straight circumferential lines in the soft uncured rubber of the pre-grooved tread stock 50 are forced into the voids of the matrix by the contours of the ribs 49 so that there is an automatic lateral shifting of portions of the coils into the serpentine grooves 48 to substantially follow the contour of said grooves. However, to obtain such a result, the center lines of the traction coils 38, when in straight form in the tread stock 50 of FIG. 17, must not overlap any part of a metal rib. Thus, referring to center line d of one of the projected coils on FIG. 16, it is to be noted that the farthest wave of the rib 49 to the right does not overlap said center line. Also the maximum amount of wave of one of the ribs 49, such as at a, must not exceed the width of one of the grooves 48. Otherwise, instead of causing the coil to wave when the tread stock is being expanded into the matrix, the ribs 49 would engage on top of the coils and force them into the carcass with undesirable results.

It is apparent from the above that, with the use of the method of FIGS. 16 and 17, a tread slab 50, having preformed, straight circumferential grooves 51, can be employed to automatically load coils 38 or other flexible traction-augmenting elements into curved or angled grooves of a matrix, the ribs 49 of the matrix engaging between coils to form the grooves 52 in the finished tire, as shown in FIG. 18, and the rubber of the tread stock flowing into the grooves 51 to close said grooves and to cure around the coils 38 so that there is one serpentine coil 38 in each serpentine rider strip 39, as shown in FIG. 18. In the claims the terms serpentine includes either the curved pattern of FIG. 18 or the angled pattern suggested in FIG. 19.

Figure 20:
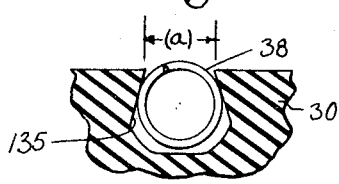
FIG. 20 is a view similar to FIG. 12 showing a modified cross-sectional shape for the groove used more particularly in retreading operations.

FIG. 20 discloses a modification, used in retreading of tires, wherein the tread stock 30 has an undercut groove 135 which is wider at the bottom than at the top. Referring to FIG. 20, the width at a will be less than the diameter of the coil 38, preferably about one-half of said diameter, so that the coil will snap into position in the groove. Just as in FIG. 12 the groove depth will be somewhat more than one-half the diameter of the coil. The undercut groove at FIG. 20 minimizes the coils popping out during the retreading process.

Figure 21:
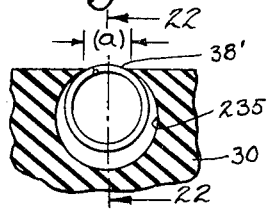
FIG. 21 is a similar view showing another modified cross-sectional shape for the groove used more particularly when building new tires using short lengths of wire.

In FIG. 21 another type of undercut groove 235 is illustrated. This is particularly useful in building new tires such as the tires of FIG. 7 where segmental strips of wire are employed which have previously been positioned in a green tire carcass in the manner shown in FIG. 6. Here the grooves 235 are preferably circular in cross-section and about one-third larger in diameter than the diameter of the coils. As in FIG. 20, the distance a will be about one-half of the diameter of the coil. Due to the fact that in new tire manufacture the coils are usually inserted in a cylindrical green carcass of the type shown in FIG. 6, the segmental coils 38', when first inserted, tend to assume the condition shown in FIG. 22, the ends being close to the periphery of the tire and the center of each length being against the bottom of the groove 235. By having the oversize grooves this action is permitted. When the new tire is being manufactured from the green carcass of FIG. 6 to produce the final tire of FIG. 7, the green carcass is axially compressed and circumferentially stretched, and during this procedure the entire cross-sectional dimension of each groove shrinks, with the wire ending up in the proper final position of FIG. 7. This modified procedure of FIGS. 21 and 22 keeps the coils from interfering with even stretching of the rubber during the circumferential expansion process, yet the coils are always held in place by the restricted width a of the top opening of the groove. This procedure, therefore, minimizes the possibility of the finished tire being unbalanced.

It is to be understood that in the claims the term "rubber" includes natural rubber, synthetic rubber, or any combination thereof as used in tread stock.

What I claim is:

1. In a method of manufacturing tire treads with elongated traction-augmenting members therein, the steps of forming laterally spaced circumferential pattern forming matrix grooves in a matrix which are separated by circumferential ribs, forming laterally spaced longitudinally extending locating tread stock grooves in a strip of uncured rubber tread stock which tread stock grooves conform in location and spacing with the grooves of the matrix, wrapping and securing a length of said strip around a tire, inserting elongated flexible traction-augmenting members in said tread stock grooves which are of a width to be snugly received and held in the tread stock grooves, pressing said tread strip into said matrix with the matrix ribs located between grooves of said tread strips, and applying heat and pressure to mold the pattern of the matrix into the tread stock strip while the elongated traction-augmenting members are aligned with the matrix grooves and while causing the rubber to cure around the traction-augmenting members in said matrix grooves.

2. A method of manufacturing tire treads as claimed in claim 1 in which the traction-augmenting members are wire coils.

3. A method of manufacturing tire treads as claimed in claim 1 in which the traction-augmenting members are strips of uncured rubber containing longitudinally spaced metal studs.

4. A method of manufacturing tire treads as claimed in claim 1 in which the tread stock grooves are formed in the tread stock while the tread stock is being extruded from a die.

5. A method of manufacturing tire treads as claimed in claim 1 in which the tread stock is formed with straight grooves and in which the matrix is produced with serpentine grooves and ribs having waved portions of such limited lateral displacement that portions of the elongated traction-augmenting members are displaced laterally during the matrix molding action to conform to the serpentine pattern of the matrix grooves.

6. A method of manufacturing tire treads as claimed in claim 1 in which the strip of tread stock is wrapped around a green tire and in which a plurality of segmental lengths of the elongated traction-augmenting members are inserted end to end in each tread stock groove of said strip.

7. A method of manufacturing tire treads as claimed in claim 5 in which the matrix ribs are formed with a tapered cross section to act on the coils in aiding the lateral displacement thereof.

References Cited

UNITED STATES PATENTS

| | | | |
|---|---|---|---|
| 2,054,448 | 9/1936 | Russell | 161—123 |
| 2,565,619 | 8/1951 | Oest | 152—211 |
| 2,619,678 | 12/1952 | Crooker | 264—229 |
| 2,666,470 | 1/1954 | Kimes | 152—211 |
| 2,756,799 | 7/1956 | Pfeiffer | 152—211 |

FOREIGN PATENTS

| | | | |
|---|---|---|---|
| 1,215,122 | 4/1960 | France | 152—211 |
| 554,698 | 3/1956 | Italy | 152—210 |

BENJAMIN A. BORCHELT, Primary Examiner

R. E. HART, Assistant Examiner

U.S. Cl. X.R.

152—211